Aug. 23, 1932.     R. R. McKNIGHT ET AL     1,873,451
TOOL FOR FORMING TUBE CONNECTIONS
Filed Feb. 3, 1930
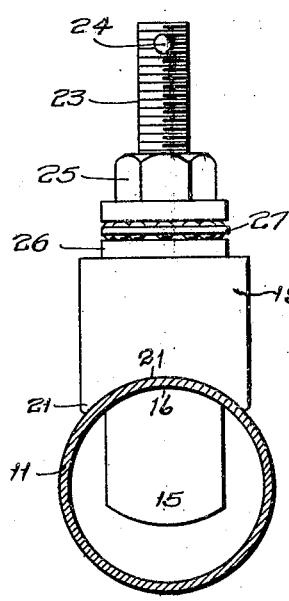
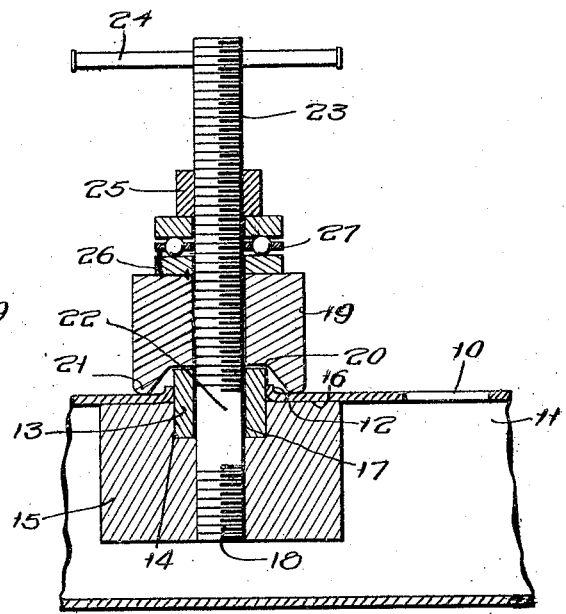

Patented Aug. 23, 1932

1,873,451

UNITED STATES PATENT OFFICE

RUFUS R. McKNIGHT AND ARTHUR WEBBER, OF CHICAGO, ILLINOIS, ASSIGNORS TO THE DE MOE ENGINEERING LABORATORIES, INC., OF CHICAGO, ILLINOIS, A CORPORATION OF ILLINOIS

TOOL FOR FORMING TUBE CONNECTIONS

Application filed February 3, 1930. Serial No. 425,691.

This invention relates to new and useful improvements in tools for forming tube connections.

In uniting tubes to drums or headers, it has heretofore been the general practice to drill or punch an aperture in the wall of the header and thereafter to insert the end of a tube through said aperture and to secure the same in place by welding. This method of uniting tubes to headers is objectionable, in that the inner end of the inserted tube constitutes a break or interruption in the continuity of the inner wall surface which affords a point of lodgment for scale or other deposits.

The tool of the present invention is employed in forming a flared or throated aperture to which the tubes may be abutted and welded, thereby affording a more perfect union and avoiding rough or uneven surfaces on the interior, and affording each tube with a flared or rounded throat which prevents the deposition of scale or other deposits.

The tool of the present invention employs a die of greater diameter than the plain cut aperture, which is forced through the aperture under pressure applied to the inner and outer walls of the header in a manner presently to be described.

In the drawing:

Figure 1 is a side elevation of the tool of the present invention, looking inwardly into a drum or header upon which the tool is operating; and Fig. 2 is a sectional elevation of the same, taken at right angles to the position shown in Figure 1.

The tool is employed for the purpose of providing an outwardly extending throat in the wall of a drum or header, and this tool will first be described.

Referring particularly to Fig. 2, a plain aperture 10 is first cut, preferably by drilling, in the cylindrical wall of a drum or header 11. The tool is employed to give to the plain cut aperture 10 a flaring flange or throat 12, which is secured by enlarging the aperture to the extent necessary to permit the passage therethrough of a male die member 13.

The male die member 13 is carried within a socket recess 14 in an inner block 15, the upper surface 16 of which is rounded to conform to the inner curvature of the drum or header. The male die is provided with a bore 17, through which freely extends a draw screw 19, which at its lower end is threaded into the block 15. The screw is freely entered through a female die member 18 which is recessed in its inner face 20, which recessed portion is surrounded by a marginal flange 21 which conforms to the exterior curvature of the drum or header. The intermediate portion 22 of the screw is plain or unthreaded, while the upper portion 23 of the screw is again threaded. A handle 24 is entered through the screw to facilitate turning thereof. A nut 25 is threaded upon the upper end of the screw, and below the nut is located a washer 26 freely mounted upon the screw, while between the nut and the washer is interposed a ball bearing assembly 27.

In using the tool above described, the inner block 15, with the male die socketed therein, is first brought into position below the aperture which it is intended to flare or throat. Thereafter the screw is freely passed through the ball assembly 27, the washer 26, the female die 19, and the male die 13, and threaded into the inner block 15, the nut 25 being retracted sufficiently to permit the screw to engage the threads of the block 15. With the parts thus assembled, the nut 25 will be rotated by a wrench or similar tool, which lifts the block 15 and with it the male die, bringing the latter into engagement with the rim of the hole or aperture, after which continued rotation of the nut causes the male die to force its way through the aperture and flare the same to afford an exteriorly extending rim or throat.

Although the tool is designed primarily for use in flaring apertures in the walls of drums or headers or other cylindrical structures, it is equally applicable for use in the flaring of apertures in flat metal plates. The invention is one which greatly facilitates the operations in question, since the manipulation of the tool is almost entirely from a point outside the drum or header, so that no difficulty is experienced by reason of restrictions in the space afforded for the manipulation of the tool. By flaring or throating the apertures in the manner described, a steady and uniform pressure is exerted, which gradually and evenly stretches the metal, so that the throat when formed will be free from cracks or checks and will present a perfect unbroken rim or margin for the union of the tubes intended to be secured to the header.

Although the invention has been described with particularity as to detail, it is not the intention to limit the same strictly to the tools specifically shown, since modifications thereof may be made without departing from the spirit of the invention.

We claim:

1. In a hand tool for throating apertures in metal walls, the combination of a block of substantially greater surface dimensions on its acting face than the diameter of the aperture and normally standing in spaced relaton to one surface of the metal wall and adapted at the conclusion of the throating operation to be brought into contact with the said wall, a screw adapted to be entered through the aperture and having its inner end threaded into said block, a handle for rotating said screw to engage and lift said block toward said metal wall, a male die member of lesser diameter than the block and carried thereby and projecting upwardly therefrom and bored through its center to afford free passage for the screw, and adapted by the movement of the block to be forced through the aperture to throat the margin thereof, a female die member freely mounted upon the screw and recessed upon its bearing face to afford clearance for the throating of the aperture by the passage of the male die member therethrough, said female die member being configured to bear against the side of the metal wall opposite to the block in the region immediately adjacent to the aperture to be throated, and a nut carried by said screw beyond the female die member and adapted when rotated to maintain the female die member in contact with the metal on one side and to advance the block with the male die member carried thereby from the other side of the metal to cause the male die member to distend the margins of the aperture and throat the same.

2. In a hand tool for throating apertures in metal walls, the combination of a block of substantially greater surface dimensions on its acting face than the diameter of the aperture and normally standing in spaced relation to one surface of the metal wall and adapted at the conclusion of the throating operation to be brought into contact with the said wall, a screw adapted to be entered through the aperture and having its inner end threaded into said block, a handle for rotating said screw to engage and lift said block toward said metal wall, a male die member of lesser diameter than the block and carried thereby and projecting upwardly therefrom and bored through its center to afford free passage for the screw, and adapted by the movement of the block to be forced through the aperture to throat the margin thereof, a female die member freely mounted upon the screw and recessed upon its bearing face to afford clearance for the throating of the aperture by the passage of the male die member therethrough, said female die member being configured to bear against the side of the metal wall opposite to the block in the region immediately adjacent to the aperture to be throated, and a nut carried by said screw beyond the female die member and adapted when rotated to maintain the female die member in contact with the metal on one side and to advance the block with the male die member carried thereby from the other side of the metal to cause the male die member to distend the margins of the aperture and throat the same, and ball bearing members interposed between the nut and the female die member to facilitate rotation of the nut upon the screw without imparting rotation to the female die member.

3. In a hand tool for throating apertures in metal walls, the combination of co-operating male and female die members separable from one another, one of said members being associated with a block adapted to be inserted into the interior of a tube having an aperture in its side wall and brought into alignment with said aperture, and the other of said members being adapted to engage the exterior of the tube adjacent to the aperture, the interior block having a threaded bore, and a screw adapted to be inserted from the exterior through one of said die members to bring the inner end of the screw into threaded engagement with the bore in the block, means on the exterior of the screw for facilitating rotation thereof to lift the block toward the interior surface of the tube and maintain the die members in coacting relation with opposite sides of the tube and in operative relation to the aperture, and an exterior nut on the screw adapted to advance the die members toward one another to force the male die member through the aperture to throat the same.

In witness that we claim the foregoing we have hereunto subscribed our names this 24th day of January, 1930.

RUFUS R. McKNIGHT.
ARTHUR WEBBER.